United States Patent
Chen et al.

(10) Patent No.: US 10,221,067 B2
(45) Date of Patent: Mar. 5, 2019

(54) SYNGAS COOLER

(71) Applicant: General Electric Company, Schenectady, NY (US)

(72) Inventors: Lien-Yan Chen, Spring, TX (US); Qiong Zhou, Houston, TX (US); Rajeshwar Sripada, Hyderabad (IN)

(73) Assignee: General Electric Company, Schenectady, NY (US)

( * ) Notice: Subject to any disclaimer, the term of this patent is extended or adjusted under 35 U.S.C. 154(b) by 155 days.

(21) Appl. No.: 15/397,981

(22) Filed: Jan. 4, 2017

(65) Prior Publication Data

US 2018/0187108 A1 Jul. 5, 2018

(51) Int. Cl.
*C01B 3/02* (2006.01)
*C10J 3/86* (2006.01)

(52) U.S. Cl.
CPC ............ *C01B 3/02* (2013.01); *C10J 3/86* (2013.01); *C10J 2300/1659* (2013.01); *C10J 2300/1662* (2013.01); *C10J 2300/1884* (2013.01); *C10J 2300/1892* (2013.01)

(58) Field of Classification Search
CPC .... F28D 1/05308; F28D 1/053; F22B 21/085; F22B 21/12
See application file for complete search history.

(56) References Cited

U.S. PATENT DOCUMENTS

| | | | | |
|---|---|---|---|---|
| 3,988,123 | A * | 10/1976 | Coates | C10J 3/485 48/73 |
| 4,272,255 | A * | 6/1981 | Coates | C10J 3/485 122/5 |
| 5,248,316 | A * | 9/1993 | Peise | C01B 3/22 122/6 A |
| 5,713,312 | A * | 2/1998 | Waryasz | C10J 3/86 110/234 |
| 6,312,482 | B1 | 11/2001 | James et al. | |
| 6,435,139 | B1 | 8/2002 | Brucher | |
| 7,132,183 | B2 | 11/2006 | Galloway | |
| 7,587,995 | B2 | 9/2009 | Kraft et al. | |
| 7,931,710 | B2 * | 4/2011 | Alexander | C10J 3/86 122/7 D |
| 8,240,366 | B2 * | 8/2012 | Storey | F22B 1/1846 122/7 R |
| 8,783,036 | B2 | 7/2014 | Corry et al. | |
| 9,688,927 | B2 * | 6/2017 | Chen | C10J 3/86 |
| 2011/0243804 | A1 | 10/2011 | Steinhaus | |

* cited by examiner

*Primary Examiner* — Matthew J Merkling
(74) *Attorney, Agent, or Firm* — Fletcher Yoder, P.C.

(57) ABSTRACT

A syngas cooler is configured to cool a syngas. The syngas cooler includes a superheater heat exchanger, which further includes a first header configured to receive saturated steam, a second header configured to discharge superheated steam, and a first group of tubes directly coupled to and vertically extending between the first and second headers. Each tube of the first group of tubes includes an outer surface that interfaces with the syngas and a respective length between the first and second headers, and each tube of the first group of tubes does not contact another tube along the respective length to enable a flow of the syngas around each tube's outer surface along its respective length and between each tube.

16 Claims, 10 Drawing Sheets

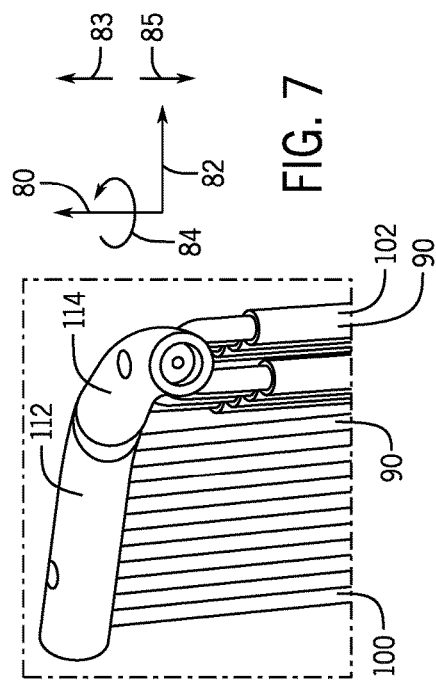
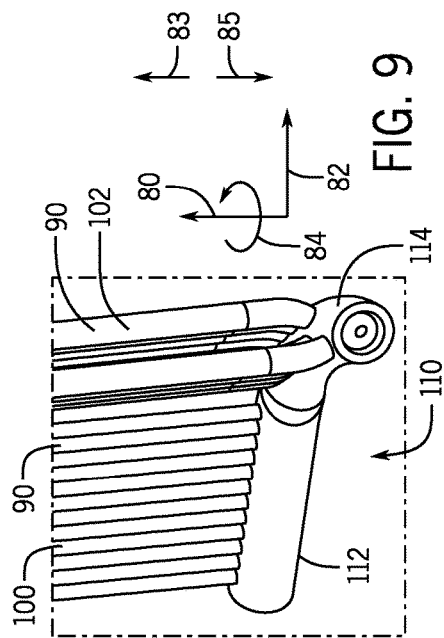
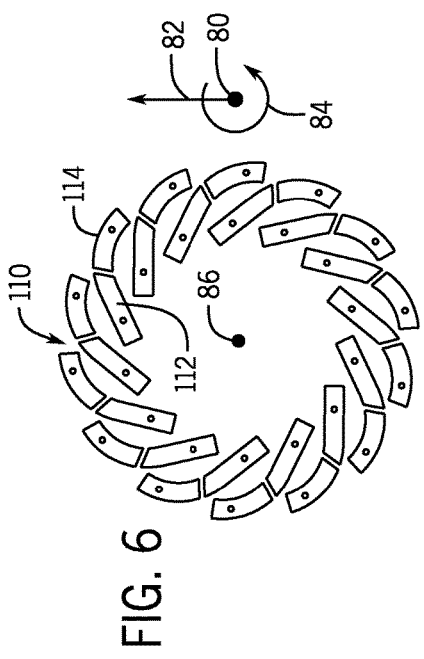
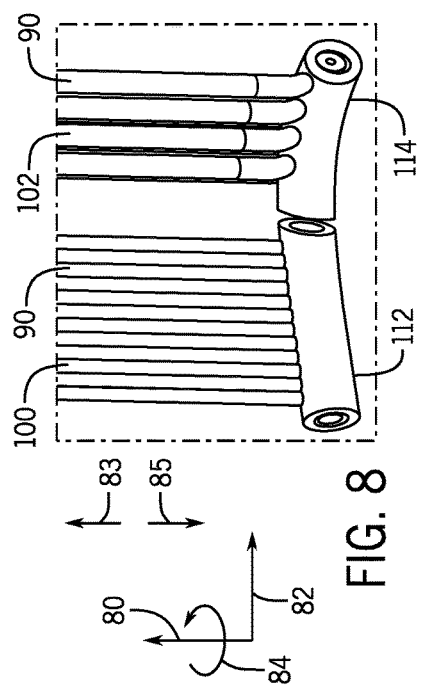

SYNGAS COOLER

BACKGROUND

The subject matter disclosed herein relates to syngas coolers within gasification systems and, more particularly, heat exchanging surfaces within the syngas coolers.

Gasifiers convert carbonaceous materials into a mixture of carbon monoxide and hydrogen, referred to as synthesis gas or syngas. For example, a gasification system includes one or more gasifiers that react a feedstock at a high temperature with oxygen and/or steam to produce syngas. The syngas may be used for power generation, chemical production, or any other suitable application. Prior to use, the syngas may be cooled in a syngas cooler via a heat exchanging system and treated in a gas treatment system. The heat exchanging system may produce saturated steam and/or superheated steam when cooling the syngas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a syngas cooler is configured to cool a syngas. The syngas cooler includes a superheater heat exchanger, which further includes a first header configured to receive saturated steam, a second header configured to discharge superheated steam, and a first group of tubes directly coupled to and vertically extending between the first and second headers. Each tube of the first group of tubes includes an outer surface that interfaces with the syngas and a respective length between the first and second headers, and each tube of the first group of tubes does not contact another tube along the respective length to enable a flow of the syngas around each tube's outer surface along its respective length and between each tube.

In a second embodiment, a syngas cooler configured to cool a syngas. The syngas cooler includes a group of superheater heat exchangers. Each superheater heat exchanger further includes a first header configured to receive saturated steam, a second header configured to discharge superheated steam, and a first group of tubes directly coupled to and vertically extending between the first and second headers. Each tube of the first group of tubes includes an outer surface that interfaces with the syngas and has a respective length between the first and second headers. Each tube of the first group of tubes does not contact another tube along the respective length to enable a flow of the syngas around each tube's outer surface along its respective length and between each tube. The group of superheater heat exchangers also includes a group of saturation heat exchangers. Each saturation heat exchanger includes a third header configured to receive water, a fourth header configured to discharge saturated steam, a second group of tubes directly coupled to and vertically extending between the third and fourth headers. Each tube of the second group of tubes interfaces with the syngas. Furthermore, the group of superheater heat exchangers and the group of saturation heat exchangers are located at a same axial location relative to a longitudinal axis of the syngas cooler.

In a third embodiment, a syngas cooler is configured to cool a syngas. The syngas cooler includes a group of superheater heat exchangers. Each superheater heat exchanger includes a first header configured to receive a saturated steam, a second header configured to discharge superheated steam, and a first group of tubes directly coupled to and vertically extending between the first and second headers. Each tube of the first group of tubes includes an outer surface that interfaces with the syngas and a respective length between the first and second headers, and each tube of the first group of tubes does not contact another tube along the respective length to enable a flow of the syngas around each tube's outer surface along its respective length and between each tube. The syngas cooler also includes a group of saturation heat exchangers. Each saturation heat exchanger includes a third header configured to receive water, a fourth header configured to discharge saturated steam, and a second group of tubes directly coupled to and vertically extending between the third and fourth headers. Each tube of the second group of tubes interfaces with the syngas. Furthermore, the group of superheater heat exchangers and the group of saturation heat exchangers are located at different axial locations relative to a longitudinal axis of the syngas cooler.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a top view of an embodiment of headers of both the superheater heat exchanger and the saturation heat exchanger of FIG. 3;

FIG. 7 is a perspective view of an embodiment of a top portion of both the superheater heat exchanger and the saturation heat exchanger of FIG. 3;

FIG. 8 is a perspective view of an embodiment of a bottom portion of both the superheater heat exchanger and the saturation heat exchanger of FIG. 3;

FIG. 9 is a different perspective view of an embodiment of a bottom portion of both the superheater heat exchanger and the saturation heat exchanger of FIG. 3;

DETAILED DESCRIPTION

Figure 1:
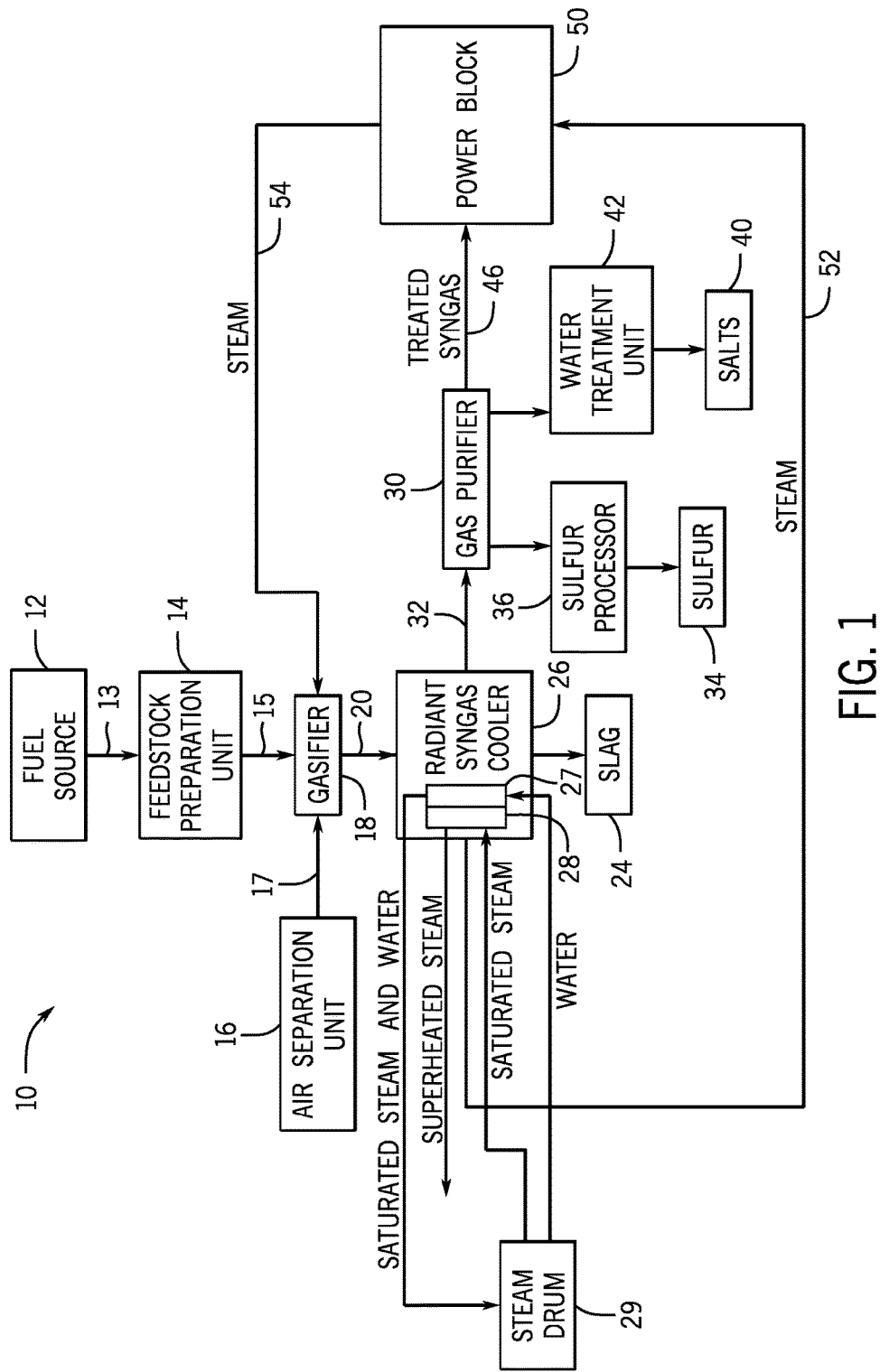
FIG. 1 is a schematic block diagram of an embodiment of a gasification system including a syngas cooler.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a gasification system including a syngas cooler, e.g., a radiant syngas cooler (RSC), which has (a) heat exchanger(s) (e.g., heat exchanger system) configured to saturate steam and water and to superheat steam. A saturation heat exchanger may receive water from a steam drum and route the water through tubes inside the syngas cooler. Syngas may interface with these tubes as it exchanges heat with the tubes and the water (e.g., cooling fluid) within the tubes. As the water is heated, nucleate boiling may be achieved (e.g., a two-phase mixture of saturated steam and saturated water). The saturated steam and water mixture may then be routed back to the steam drum to be separated into the saturated steam and saturated water components. The saturated water may be routed back to a saturation heat exchanger within the syngas cooler with make-up water or may be routed to other applications within the system. The saturated steam is routed to a superheater heat exchanger within the syngas cooler. The superheater heat exchanger may route the saturated steam through tubes on the interior of the syngas cooler. These tubes may not be contacting each other so that the syngas may flow along their length and in between adjacent tubes. As the syngas contacts the outer surface of these tubes, the syngas may transfer heat to the surface of the tubes and the saturated steam (e.g., cooling fluid). As heat is transferred to the saturated steam, the saturated steam may become superheated. The superheated steam is then routed to other downstream applications within the system. The heat exchanger system described above is cost effective and simple in design when compared to an external superheater, and may result in a reduction of transmission losses in a saturation steam circuit of the gasification system.

Turning now to the figures, FIG. 1 is a block diagram showing an embodiment of a gasification system 10 such as, but not limited to, an integrated gasification combined cycle (IGCC) system, a methanol-to-olefin chemical plant (MTO), and/or a synthetic natural gas chemical plant (SNG). The gasification system 10 includes a gasifier that may produce a syngas and a syngas cooler, e.g., radiant syngas cooler (RSC), which may cool the syngas. Elements of the gasification system 10 may include a fuel source 12, such as a solid feed 13, which may be utilized as a source of energy for the gasification system 10. The fuel source 12 may include coal, petroleum coke, biomass, wood-based materials, agricultural wastes, tars, coke oven gas, asphalt, heavy residues from a refinery, or other carbon containing items.

The fuel of the fuel source 12 may be passed to a feedstock preparation unit 14. The feedstock preparation unit 14 may, for example, resize or reshape the fuel source 12 by chopping, milling, shredding, pulverizing, briquetting, or pelletizing the fuel source 12 to generate feedstock 15. Accordingly, the feedstock preparation system 14 may include one or more grinders, mills, or any similar unit that may produce smaller particles from large particles of the fuel source 12 during operation. Additionally, water, or other suitable liquids may be added to the fuel source 12 in the feedstock preparation unit 14 to create slurry feedstock. In other embodiments, no liquid is added to the fuel source, thus yielding dry feedstock. In further embodiments, the feedstock preparation unit 14 may be omitted if the fuel source 12 is a liquid.

The gasification system 10 (e.g., IGCC, MTO, or SNG) may further include an air separation unit (ASU) 16. The ASU 16 may operate to separate air into component gases by, for example, distillation techniques. The ASU 16 may separate oxygen 17 from the air supplied to it from a supplemental air compressor, and the ASU 16 may transfer the separated oxygen 17 to a gasifier 18.

The feedstock 15, and in certain embodiments, the oxygen 17 from the ASU 16, may be passed to the gasifier 18 (e.g., a partial oxidation vessel) from the feedstock preparation unit 14. The gasifier 18 includes a reactor or a reaction chamber disposed in a gasification vessel to enable gasification to produce a syngas 20. The gasifier 18 may convert the feedstock 15 into the syngas, e.g., a combination of carbon monoxide (CO) and hydrogen. This conversion may be accomplished by subjecting the feedstock 15 to a controlled amount of steam and an oxidizer 17 (e.g., pure oxygen, air, or a mixture thereof) at elevated pressures, e.g., from approximately 20 bar to 85 bar, and temperatures, e.g., approximately 700 degrees Celsius (° C.) to 1600 degrees C. (1292 degrees Fahrenheit [° F.] to 2912° F.), depending on the type of gasifier 18 utilized. The gasifier 18 is a fluidized-bed gasifier. During the gasification process, the feedstock may undergo a pyrolysis process, whereby the feedstock is heated. Temperatures inside a gasification chamber of the gasifier 18 may range from approximately 150° C. to 700°

C. (302° F. to 1292° F.) during the pyrolysis process, depending on the fuel source 12 utilized to generate the feedstock 15.

The volatiles generated during the pyrolysis process, also known as devolatilization, may be partially combusted by introducing an oxidant 17 to the gasifier 18. The volatiles may react with the oxidant 17 to form $CO_2$ and CO in combustion reactions, which provide heat for the subsequent gasification reactions. The temperatures generated by the partial combustion reactions may range from approximately 700° C. to 1600° C. (1292° F. to 2912° F.). Next, steam may be introduced into the gasifier 18 during a gasification step. The char may react with the $CO_2$ and steam to produce CO and hydrogen at temperatures ranging from approximately 800° C. to 1100° C. (1472° F. to 2012° F.). In essence, the gasifier 18 utilizes steam and oxygen 17 to allow some of the feedstock 15 to be partially oxidized to produce CO and release energy, which drives a second reaction that converts further feedstock to hydrogen and additional $CO_2$.

In this way, the gasifier 18 manufactures a resultant gas (e.g., syngas 20). This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 18 may also generate waste, such as slag 24, which may be a wet ash material. This slag 24 may be removed through the quench/lock hopper system after cooling of the untreated syngas within a syngas cooler, e.g., a radiant syngas cooler (RSC) 26. The RSC 26 may include features to facilitate cooling of the syngas 20 as it flows within the RSC 26 and increase cooling efficiency. These cooling features may include heat exchangers. As described in detail below, the heat exchangers may include a saturation heat exchanger 27 (e.g., saturator) and superheater heat exchanger 28 (e.g., superheater). The saturator 27 may receive boiler water (e.g., feed water) from a steam drum 29. As heat is exchanged from the syngas to the boiler water in the saturator 28, nucleate boiling ensues and the resulting two-phase mixture of saturated steam and water is re-introduced back into the steam drum 29. Within the steam drum, the saturated steam and water mixture is separated into saturated steam and water. The saturated water may be recirculated back into the RSC 26 with make-up water, which may be recirculated through the saturator 28 as described above. The saturated steam exits the steam drum 29 through a pipe and is routed to the superheater 28. As heat is further exchanged between the syngas 20 and the saturated steam, the saturated steam may become superheated steam. As described below, the superheated steam may be utilized in downstream applications. A gas treatment unit or gas purifier 30 may be utilized to clean an untreated syngas 32 exiting the RSC 26. In one embodiment, the gas purifier 30 may include a water gas shift reactor. The gas purifier 30 may scrub the untreated syngas 32 to remove the HCl, HF, COS, HCN, and $H_2S$ from the untreated syngas 32, which may include separation of sulfur 34 in a sulfur processor 36. Furthermore, the gas purifier 30 may separate salts 40 from the untreated syngas 32 via a water treatment unit 42 that may utilize water purification techniques to generate usable salts 40 from the untreated syngas 32. Subsequently, the gas from the gas purifier 30 may include treated syngas 46 (e.g., the sulfur 34 has been removed from the syngas), with trace amounts of other chemicals, e.g., $NH_3$ (ammonia) and $CH_4$ (methane).

In some embodiments, a residual gas processor may be utilized to remove additional residual gas components, such as ammonia and methane, as well as methanol or any residual chemicals from the treated syngas. However, removal of residual gas components from the treated syngas 46 is optional, because the treated syngas 46 may be utilized as a fuel even when it includes the residual gas components, e.g., tail gas.

The treated syngas 46, which has undergone the removal of its sulfur containing components and a large fraction of its carbon dioxide, may be transmitted to a power block 50. For example, the power block 50 may include a combustor of a gas turbine engine, which may utilize the syngas 46 as combustible fuel. The gas turbine engine may drive a load, such as an electrical generator for producing electrical power. In certain embodiments, the power block 50 may also include a heat recovery steam generator. The heat recovery steam generator may utilize steam 52 produced by the RSC 26. In some embodiments the steam 52 may be the superheated steam as described above. In certain embodiments, the heat recovery steam generator may provide steam 54 to the gasifier 18, which may be utilized during the gasification process. Additionally, the heat recovery steam generator may provide steam to a steam turbine engine for power generation, e.g., an electrical generator driven by a steam turbine.

Figure 2:
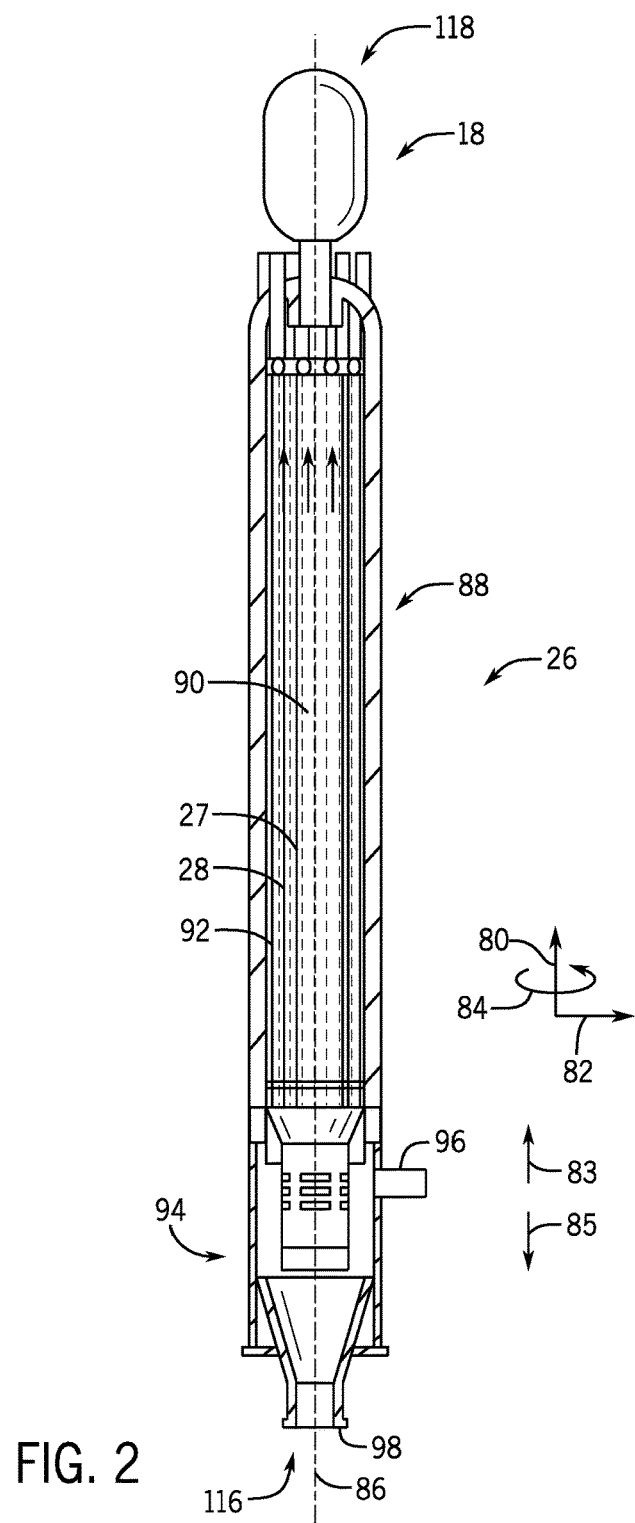
FIG. 2 is a cross-sectional side view of an embodiment of the syngas cooler of FIG. 1.

FIG. 2 is a cross-sectional side view of an embodiment of a radiant syngas cooler (RSC) 26 for use in a gasification system. Various aspects of the RSC 26 may be described with reference to an axial direction or axis 80, a radial direction or axis 82, and a circumferential direction 84. For example, axis 80 corresponds to a longitudinal centerline or lengthwise direction, and axis 82 corresponds to a crosswise or radial direction relative to the longitudinal centerline. Elements of the RSC 26 may also be described relative to an upstream direction 83, and a downstream direction 85. Further, the RSC 26 has a central axis 86 (e.g., longitudinal axis), which runs parallel to the axial axis 80.

The RSC 26 receives syngas generated in the gasifier 18. In the current embodiment, the gasifier 18 is integrated with the RSC 26. However, in some embodiments, the gasifier 18 may be a separate unit from the RSC 26. The RSC 26 cools the syngas prior to transmission elsewhere within the gasification system 10 (e.g., the IGCC, MTO, or SNG). Cooling may begin within a vessel 88 which encloses the internal components of the RSC 26. The vessel 88 may house tubes 90 (e.g., cooling pipes, pipes, tubules) which run parallel in orientation with the vessel 88, which may be oriented vertically in the case of a syngas cooler or perpendicularly in the case of a convective cooler (relative to the axial axis 80). The tubes 90 may be approximately 20 meters long in some embodiments. The tubes 90 may include heat exchangers (e.g., the saturation heat exchanger 27 and the superheater heat exchanger 28) as well as a tube cage 92 (e.g., tube wall). The tube cage 92 may help protect walls of the vessel 88 from high temperatures experienced by the RSC 26. In some embodiments, the tube cage 92 may act as a heat exchanger similar to the saturator 27 (e.g., saturation heat exchanger 27). As described above, fluid, such as water and/or steam, may flow through the tubes 90 and act as a coolant (e.g., cooling fluid). Thus, the tubes 90 may facilitate a heat exchange process within the RSC 26 between the coolant in the tubes 90 and the syngas entering the vessel 88. The syngas generated in the gasifier 18 may generally flow in the downstream direction 85 in the cavity of the vessel 88, parallel to the tubes 90. In this manner, the syngas may contact the outside surface of the pipes 20 within the RSC 26, and the fluid flowing through the tubes 90 may remove heat from the syngas as it travels through the RSC 26.

When the syngas enters the RSC 26 from the gasifier 18, the syngas may reach a temperature of up to 2800° F. (1,538° C.). Once the syngas has traveled the length of the vessel 88 and cooled via heat exchanging with the fluid inside the tubes, the syngas may be approximately 1300° F. (704° C.). During this process, the bulk of the solids (e.g., slag, or gasification waste by-product) may drop into a water pool (e.g., sump) at a bottom portion 94 of the RSC 26. The bottom portion 94 of the RSC 26 may have an internal quench system that may support a dip and draft tube, or similar method of quenching the syngas. After passing through the bottom portion 94, the syngas may be quenched to approximately 450° F. (232° C.). Then, the syngas may exit via a transfer line 96 as the solids exit via a quench cone 98. As described above, once the syngas exits the RSC 26, the syngas may be used as a fuel in downstream processes. As the heated syngas interacts with the tubes 90, it may transfer heat to the fluid inside the pipes 20, thus cooling the syngas. As described above, and in further detail below, the heated syngas may be cooled via the saturator 27 and the super heater 28. The saturator 27 may be located closer to the path (e.g., closer to the central axis 86) of the heated syngas than the superheater 28. This is done to reduce the overall metal temperatures of heat transfer surfaces of the tubes 90 and thereby extend the life of the tubes 90. For example, the saturator 27 may have fluid (e.g., water-steam mixture) flowing at a lower temperature than fluid (e.g., steam) flowing through the superheater 28. Furthermore, tubes 90 of the superheater 28 are separated from each other and are not in direct contact with each other. The separation of the tubes 90 of the superheater 28 is to ensure uniform metal temperature, and to minimize thermal stresses and fouling by ash. Due to the high temperatures experienced by the superheater 28, the tubes 90 of the superheater 28 may have a larger diameter and thickness relative to the tubes 90 of the saturator 27. Furthermore, in some embodiments, the cooling fluid in the saturator 27 may flow in the upstream direction 83 (e.g., as a counter flow heat exchanger). In some embodiments, the cooling fluid in the superheater 28 may flow in the downstream direction 85 (e.g., as a parallel heat exchanger), and in some embodiments, the cooling fluid in the superheater 28 may flow in the upstream direction 83 (e.g., as a counter flow heat exchanger).

Figure 3:
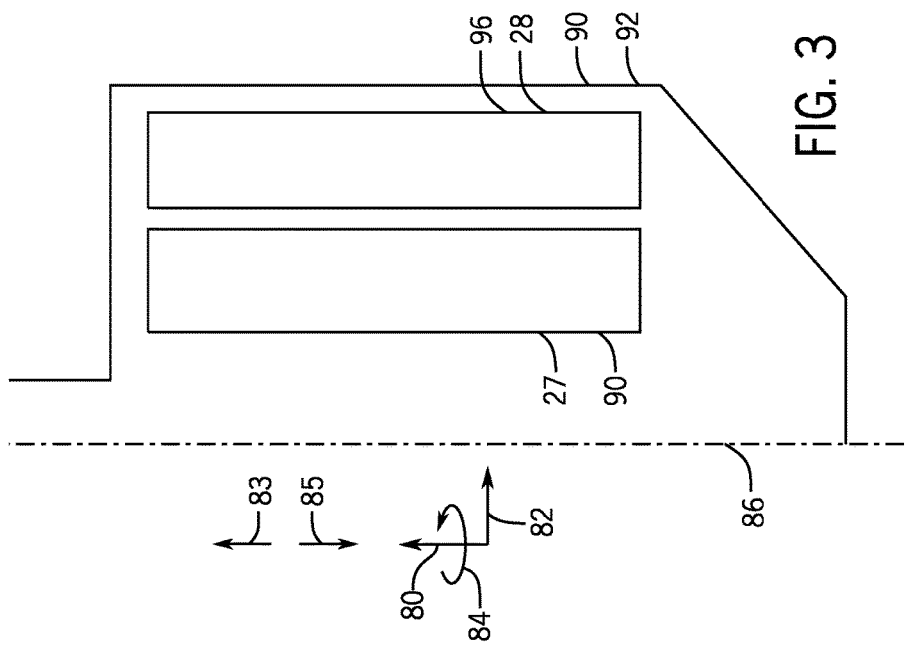
FIG. 3 is a cross-sectional schematic view of an embodiment of a superheater heat exchanger and a saturation heat exchanger within the syngas cooler of FIG. 2.

FIG. 3 is a cross-sectional schematic view of an embodiment of the superheater 28 and the saturator 27 within the RSC 26 of FIG. 2. As mentioned above, the saturator 27 may be placed generally radially 82 closer to the central axis 86 than the superheater 28. As shown, the saturator 27 and the superheater 28 are separated in the radial direction 82.

The length relative to the axial direction 80 of the superheater 28 may span a portion of length of the vessel 88. The length of the superheater 28 may be dependent on a quantity of superheated steam requirement and/or a temperature of superheated steam requirement of the system 10. For example, the greater the temperature and/or quantity requirement of superheated steam, the greater the length of the superheater 28. The number of tubes 90 of the superheater 28 may also depend on the temperature and/or quantity requirement of superheated steam in a similar fashion. For example, the greater the temperature and/or quantity requirement of superheated steam, the greater the number of tubes 90 of the superheater 28.

In the current embodiment, the cooling fluid in the saturator 27 flows in the upstream direction 83. Similarly, in the current embodiment, the cooling fluid in the superheater 28 flows in the downstream direction 85. In some embodiments, the cooling fluid in the super heater 28 flows in the upstream direction 83.

Figure 4:
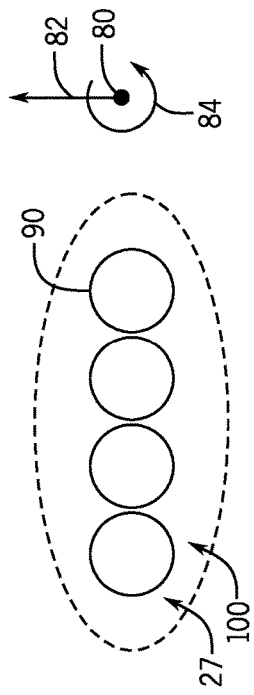
FIG. 4 is a schematic top view of an embodiment of tubes of the saturation heat exchanger of FIG. 3.

FIG. 4 is a schematic top view of an embodiment of saturator tubes 100. In some embodiments, the saturator tubes 100 may be in direct contact with one another. In some embodiments, the saturator tubes 100 may simply be adjacent one another with a webbing (e.g., fin, welding) coupling the saturator tubes 100 together. In the current embodiment, the saturator tubes 100 are in a linear configuration. In some embodiments, the saturator tubes 100 may be coupled to have a curved or angled configuration.

Figure 5:
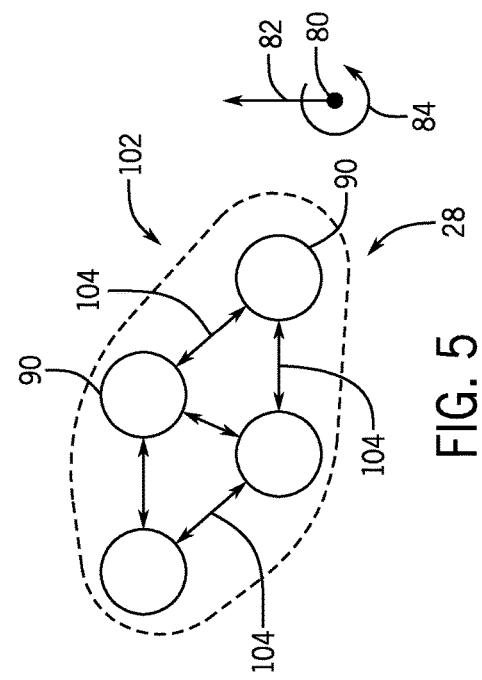
FIG. 5 is a schematic top view of an embodiment of tubes of the superheater heat exchanger of FIG. 3.

FIG. 5 is a schematic top view of an embodiment of superheater tubes 102 which may be spaced apart as described above. In the current embodiment, the superheater tubes 102 are in a staggered (e.g., offset) formation. In some embodiments, the superheater tubes 102 may all be equally spaced so that a radial distance 104 is the same for all adjacent superheater tubes 102. In some embodiments, the radial distance 104 may differ from one superheater tube 102 to the next superheater tube 102. Furthermore, the separation of the superheater tubes 102 may enable the syngas to flow between each superheater tubes 102, 360° around each superheater tube 102, and along a length of each superheater tube 102.

FIG. 6 is a vertical view of an embodiment of headers 110 of both the superheater 28 (e.g., superheater heat exchanger 28) and the saturator 27 (e.g., saturation heat exchanger 27) of FIG. 3. The headers 110 may include an inner header 112 and an outer header 114. As described above, the saturator 27 may be located closer to the central axis 86 of the RSC than the superheater. As such, the inner headers 112 may be a portion of the saturator 27 and the outer headers 114 may be a portion of the superheater 28. It should generally be noted that the saturator 27 and the superheater 28 each include headers at opposite lengths of the RSC. For example, the saturator 27 may include a header adjacent a downstream end 116 (e.g., bottom end) of the RSC 26 and a header adjacent an upstream end 118 (e.g., top end) of the RSC 26. Therefore, the inner headers 112 may be configured to receive water (e.g., feed water) and discharge saturated steam and saturated water. Similarly, the outer headers 114 may be configured to receive saturated steam and discharge superheater steam. The individual headers 110 are generally in a "J" shape and are arranged circumferentially 84 about the central axis 86. In other words, the outer headers 114 (e.g., superheaters 28) and the inner headers 112 (e.g., saturators 27) are disposed radially 82 adjacent each other relative to the central axis 86, and a majority of the outer header 114 is radially 82 outward of the inner header 112. Furthermore, in some embodiments there may be 14 headers 110, 9 headers 110, more than 14 headers 110, or less than 14 headers 110. The number of headers 110 may depend on superheated steam and/or saturated steam and water requirements of the system 10.

FIG. 7 is a perspective view of an embodiment of a top portion of both the superheater 28 (e.g., superheater heat exchanger 28) and the saturator 27 (e.g., saturation heat exchanger 27) of FIG. 3. As shown in FIG. 6, the saturator 27 may include the inner header 112 and the saturator tubes 100, and the superheater 28 may include the outer header 114 and the superheater tubes 102. The saturator tubes 100 may be directly coupled (e.g., welded) to one of the inner headers 112 located proximate to the upstream end 118 and extend in the axial direction 80 towards the inner header 112 proximate the downstream end 116. The superheater tubes 100 may be directly coupled (e.g., welded) to one of the outer headers 114 located proximate to the upstream end 118 and extend in the axial direction 80 towards the inner header 112 proximate the downstream end 116. The superheater 28 and the saturator 27 may extend parallel along the length of the RSC 26 in the axial direction 80.

FIGS. 8 and 9 are perspective views of embodiments of a bottom portion of both the superheater 28 (e.g., superheater heat exchanger 28) and the saturator 27 (e.g., saturation heat exchanger 27) of FIG. 3. The saturator 27 may include the inner header 112 and the saturator tubes 100, and the superheater 28 may include the outer header 114 and the superheater tubes 102. The saturator tubes 100 may be directly coupled (e.g., welded) to one of the inner headers 112 located proximate to the downstream end 116 and extend in the axial direction 80 towards the inner header 112 proximate the downstream end 116. The superheater tubes 100 may be directly coupled (e.g., welded) to one of the outer headers 114 located proximate to the downstream end 116 and extend in the axial direction 80 towards the inner header 112 proximate the upstream end 118. The superheater 28 and the saturator 27 may extend parallel along the length of the RSC 26 in the axial direction 80.

As described above, the cooling fluid may flow through the saturator 27 in the upstream direction 83 while the superheater 28 may flow in the upstream direction 83 or the downstream direction 85. As such, the inner header 112 shown in FIG. 8 adjacent to the downstream end 116 may receive water and discharge saturated steam and water in the upstream end 118. The outer header 114 shown in FIG. 7 adjacent to the upstream end 118 may either receive saturated steam or discharge superheated steam depending on if the superheater 28 is acting as a parallel heat exchanger or a counter flow heat exchanger, respectively.

Furthermore, each superheater tube 102 does not contact another tube along a respective length of the superheater tube 102. This enables the syngas to flow 360° around an outer surface of each superheater tube 102, along its length, and between each superheater tube 102. To help with the flow of syngas around each superheater tube 102, the superheater tubes 102 may be in a staggered arrangement on the outer header 114 as can be seen in FIG. 5. In some embodiments, the superheater tubes 102 may be symmetrically arranged along the length of the outer header 114. In some embodiments, there may be 8 superheater tubes 102 extending from each outer header 114 adjacent the upstream end 118 to a corresponding outer header 114 adjacent the downstream end 116. Each saturator tube 100 may contact the adjacent saturator tube 100. In some embodiments, the saturator tubes 100 may be coupled to one another via tube-to-tube welding or webbing. Each saturator tube 100 may interface with the syngas flowing through the RSC 26. Each saturator 27 and superheater 28 may be located at the same axial 80 location relative to the central axis of the RSC 26. Furthermore, the tube cage 92 may be disposed outward in the radial direction 82 of both the superheater 28 and the saturator 27 relative to the central axis 86 of the RSC 26.

Figure 10:
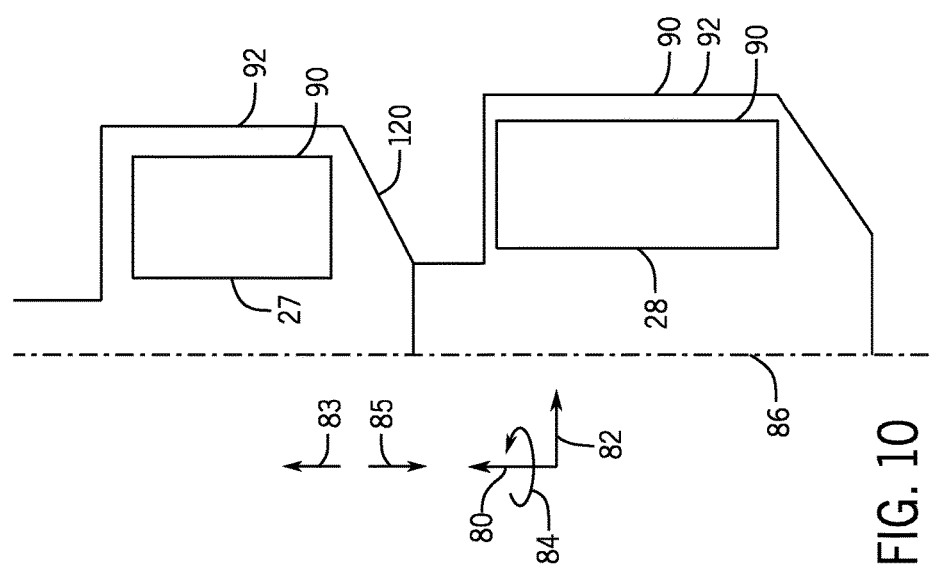
FIG. 10 is a cross-sectional schematic view of an embodiment of a superheater heat exchanger and a saturation heat exchanger within the syngas cooler of FIG. 2.

FIG. 10 is a cross-sectional schematic view of an embodiment of the superheater 28 (e.g., superheater heat exchanger 28) and the saturator 27 (e.g., saturation heat exchanger 28) within RSC 26 of FIG. 2. As can be seen in FIG. 10, the saturator 27 and the superheater 28 are located at different locations in the axial direction 80 relative to the central axis 86 of the RSC 26. More specifically, the saturator 27 may be located towards the upstream end 118 and the superheater 28 may be located towards the downstream end 116. The saturator 27 may be located closer to the upstream end 118 than the superheater 28 because the syngas that enters from the gasifier 18 will cool down as it travels in the downstream direction 85 and exchanges heat with the cooling fluid inside the heat exchangers 27, 28. In other words, tubes 90 located towards the upstream end 118 may experience higher temperatures than tubes 90 located towards the downstream end 116. Similarly, the tubes 90 located more radially 82 inward with respect to the central axis 86 (i.e., closer to the syngas flow path) may experience higher temperatures than tubes 90 that are located more radially 82 outward with respect to the central axis 86. Therefore, in some embodiments, the saturator 27 may also be located more radially 82 inward with respect to the central axis 86 than the superheater 28. In some embodiments, the saturator 27 and the superheater 28 may be located at the same location in the radial direction 82 with respect to the central axis 86. In the depicted embodiment, the superheater 28 may be placed close to the central axis 86 (e.g., near the flow path of the syngas) because as the syngas travels in the downstream direction 85, the syngas may decrease in speed and decrease in temperature.

Furthermore, the tube cage 92 may be disposed radially 82 outward of both the superheater 28 and the saturator 27 relative to the central axis 86. The tube cage 92 may be shaped to have a conical section 120 disposed axially 80 between the saturator 27 and the superheater 28 relative to the central axis 86. The conical section 120 may be disposed circumferentially 84 about the central axis 86. In some embodiments, the conical section 120 of the tube cage 92 may have a refractory lining or some other form of protection from the high temperatures of the syngas. In some embodiments, a lower portion of the tube cage 92 that is disposed in the lower portion of the RSC 26 about the superheater 28 may act as a saturator similar to the function of the saturator 27 described above. In some embodiments, a seal gas may be injected between the tube cage 92 and walls of the vessel 88. The purpose of the seal gas is to keep hot syngas from contacting the walls of the vessel 88.

Figure 11:
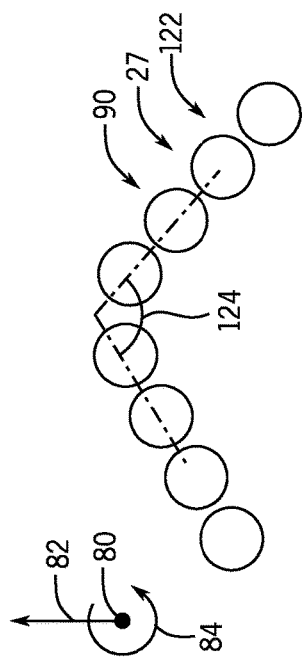
FIG. 11 is a schematic cross-sectional vertical view of an embodiment of tubes of the saturation heat exchanger of FIG. 10.

FIG. 11 is a schematic cross-sectional top view of an embodiment of tubes 90 of the saturator 27 of FIG. 10 (e.g., saturator tubes 122). The saturator tubes 122 may be disposed in two linear segments (e.g., platens). In some embodiments, the segments may be connected by more saturator tubes 122. An angle 124 between the segments may be approximately 120 degrees and/or 141 degrees. In some embodiments, the angle 124 may be greater than 120 degrees, less than 120 degrees, between 0 and 100 degrees, between 100 and 200 degrees, between 50 and 150 degrees, between 100 and 150 degrees, or any combination thereof. In some embodiments, there may be 4 saturator tubes 122 in a segment, 10 saturator tubes 122 in a segment, 12 saturator tubes 122 in a segment, greater than 10 saturator tubes 122 in a segment, or less than 10 saturator tubes 122 in a segment. In some embodiments, a segment may have a different number of saturator tubes 122 than other segments.

Figure 12:
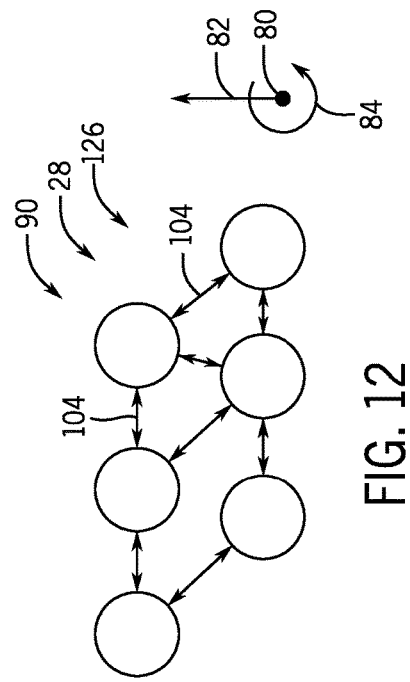
FIG. 12 is a schematic cross-sectional vertical view of an embodiment of tubes of the superheater heat exchanger of FIG. 10.

FIG. 12 is a schematic cross-sectional top view of an embodiment of tubes 90 of the superheater 28 of FIG. 10 (e.g., superheater tubes 126). In the current embodiment, the superheater tubes 126 are in a staggered formation. However, in some embodiments, the superheater tubes 126 may be in a different formation as there is not particular constraint to the formation of the superheater tubes 126 or the number of superheater tubes 126. The length and number of the superheater tubes 126 may depend on superheated steam requirements of the system 10. In some embodiments, there may be 22 superheater tubes 126, more than 22 superheater tubes 126, or less than 22 superheater tubes 126 per superheater header. In some embodiments, the material used for the superheater tubes 126 may be cheaper than a material used for the saturator tubes 122 because the superheater tubes 126 may contact the syngas at a lower temperature relative to the syngas contacting the saturator tubes 122. In some embodiments, the superheater tubes 126 may all be equally spaced so that a radial distance 104 is the same for all adjacent superheater tubes 126. In some embodiments, the radial distance 104 may differ from one superheater tube 126 to the next superheater tube 126.

Figure 13:
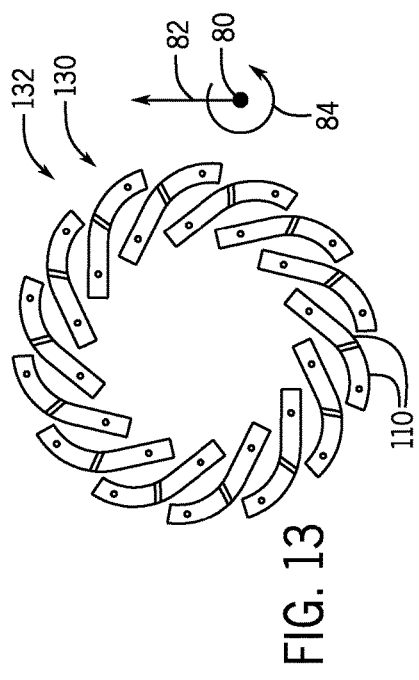
FIG. 13 is a top view of an embodiment of headers of the superheater heat exchanger and/or the saturation heat exchanger of FIG. 10.

FIG. 13 is a vertical view of an embodiment of headers 110 of the superheater 28 and/or the saturator 27 of FIG. 10. In other words, the configuration of the headers 110 depicted in the figure is the general configuration of both saturator header 130 and superheater headers 132 (i.e., the headers 110 of the saturator 27 and the superheater 28 may generally be "J" shaped and circumferentially 84 disposed about the central axis 86). However, in some embodiments, the number of saturator headers 130 may be different than the number of superheater headers 132. In some embodiments, there may be 14 headers 130, 132, less than 14 headers 130, 132, more than 14 headers 130, 132, 9 headers 130, 132, or any combination thereof. The number of headers may depend on superheated steam, and saturated steam and water requirements of the system 10. Further, in some embodiments, the saturator headers 130 may be further away from the central axis 86 than the superheater headers 132. In some embodiments, the saturator headers 130 may be closer to the central axis 86 than the superheater headers 132.

Figure 14:
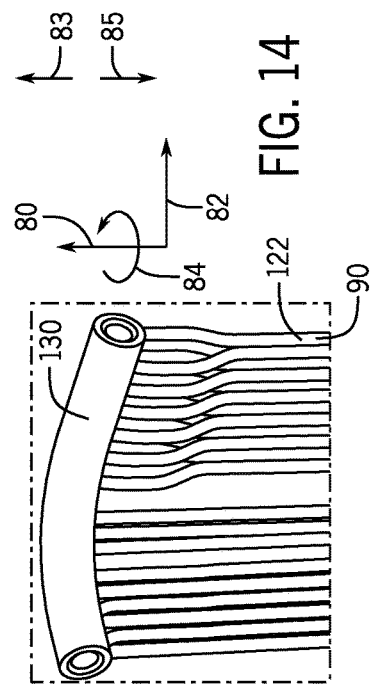
FIG. 14 is a perspective view of an embodiment showing the top header of the saturation heat exchanger of FIG. 10.

FIG. 14 is a perspective view of an embodiment of the saturator 27 of FIG. 10. The saturator tubes 122 may extend between the saturator header 130 located adjacent the upstream end 118 (e.g., upstream 83 saturator header 130) and the saturator header 130 located closer to the downstream end 116 (e.g., downstream 85 saturator header 130). In some embodiments, the saturator tubes 122 may be coupled together (e.g., contact each other) via a tube-to-tube welding, or a webbing. In some embodiments, the saturator tubes 122 may contact one another for the entire length of the saturator 27 relative to the axial direction 80. In some embodiments, the saturator tubes 122 may contact one another for the majority of their length relative to the axial axis 80. A portion of the saturator tubes that is adjacent the respective adjacent header may not be contacting each other and instead, may be flared outward. The saturator tubes 122 may then be coupled to the saturator header 130 in an offset (e.g., staggered) arrangement as is shown in the figure. In some embodiments, the downstream 85 saturator header 130 may receive water and the upstream 83 saturator header 130 may discharge saturated steam and water. Each saturator tube 122 may interface with the syngas flowing through the RSC 26.

Figure 16:
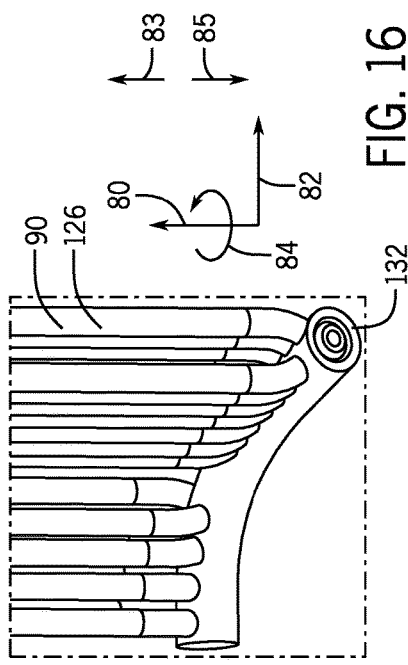
FIG. 16 is a perspective view of an embodiment showing the bottom header of the superheater heat exchanger of FIG. 10.
Figure 15:
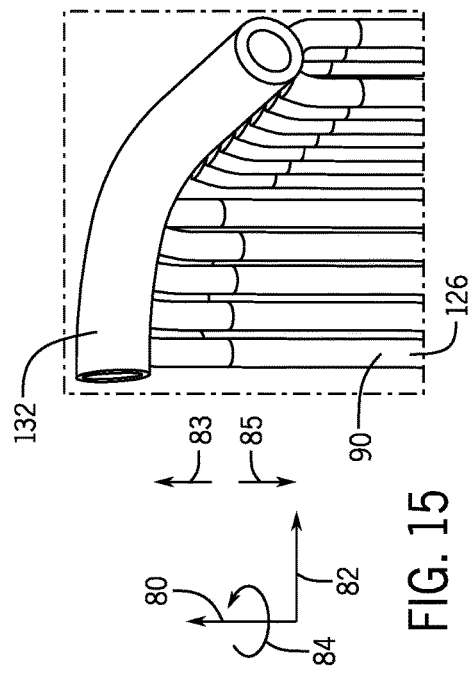
FIG. 15 is a perspective view of an embodiment showing the top header of the superheater heat exchanger of FIG. 10.

FIGS. 15 and 16 are perspective views of embodiments of the superheater 28 of FIG. 10. The superheater tubes 126 may extend between the superheater header 132 located adjacent the downstream end 116 (e.g., downstream 85 superheater header 132) and the superheater header 132 located closer to the upstream end 118 (e.g., upstream 83 superheater header 132). The superheater tubes 126 may be welded to and extend from the superheater headers 132 in a staggered (e.g., offset) arrangement. In some embodiments, the superheater tubes 126 may be welded to and extend from the superheater headers 132 in a symmetrical arrangement (e.g., not staggered). The outer surface of each superheater tube 126 interfaces with the syngas. Furthermore, each superheater tube 126 does not contact another superheater tube 126 along the respective length to enable a flow of the syngas around the outer surface of each superheater tube 126 along its respective length and between each superheater tube 126.

In some embodiments, the downstream 85 superheater header 132 may receive saturated steam and the upstream 85 superheater header 132 may discharge superheated steam. In some embodiments, the upstream 83 superheater header 132 may receive saturated steam and the downstream 85 superheater header 132 may discharge superheated steam.

Figure 17:
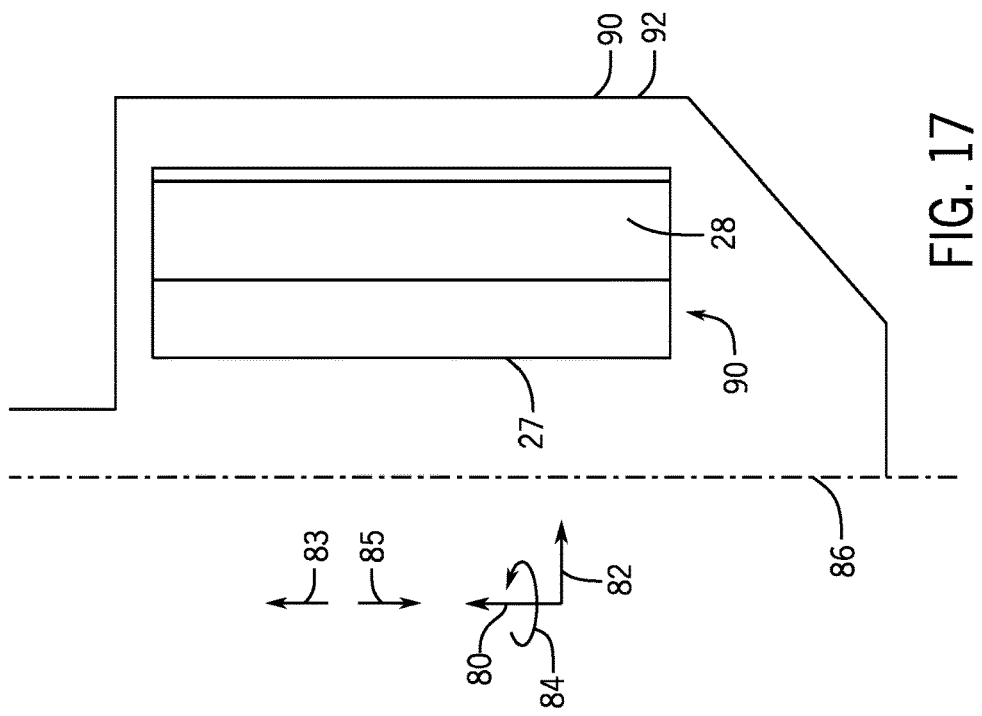
FIG. 17 is a cross-sectional schematic view of an embodiment of a superheater heater heat exchanger and a saturation heat exchanger within the syngas cooler of FIG. 2.

FIG. 17 is a cross-sectional schematic view of an embodiment of the superheater 28 (e.g., superheater heat exchanger 28) and the saturator 27 (e.g., saturation heat exchanger 27) within the RSC 26 of FIG. 2. In the current embodiment, the superheater 28 may be disposed between a pair of the saturators 27 (see FIGS. 18 and 19) in the circumferential direction 84 with respect to the central axis 86. The tube cage 92 may be disposed radially 82 outward of both the superheater 28 and the saturator 27 relative to the central axis 86. The RSC 26 may be substantially cylindrical and the saturator 27 may have a header 110 (not shown) adjacent the upstream end 118 and a header 110 (not shown) adjacent the downstream end 116. The saturator 27 may be disposed radially 82 closer to the central axis 86 of the RSC 26 (e.g., the syngas path) than the super heater.

Figure 18:
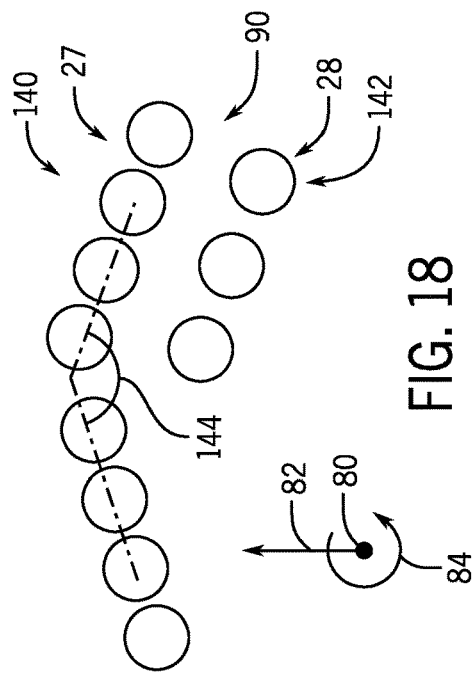
FIG. 18 is a schematic cross-sectional vertical view of an embodiment of tubes of both the superheater heat exchanger and the saturation heat exchanger of FIG. 17.

FIG. 18 is a schematic cross-sectional vertical view of an embodiment of both saturator tubes 140 of the saturator 27 and superheater tubes 142 of the superheater 28 of FIG. 17. As described in detail below, each superheater 28 is circumferentially 84 disposed relative to the central axis 86 between a pair of saturators 27. In some embodiments, each saturator 27 may include two portions of a header 110 similar to headers 130 of FIG. 14. In other words, each saturator 27 may include two linear segments (e.g., platens) of saturator tubes 140. In some embodiments, the platens may be curved in shape. The two segments may be offset at an angle 144. In some embodiments, the angle 144 may be approximately 141 degrees. In some embodiments, the angle 144 may be greater than 141 degrees, or less than 141 degrees. Furthermore, in some embodiments, the superheater tubes 142 may be disposed parallel to the segment of saturator tubes 140 that is more radially 82 outward relative to the central axis 86. In some embodiments, the superheater tubes 142 may be disposed in the vicinity of the transition from one segment to the next. In some embodiments, there may be 3 superheater tubes 142 per header. As will be discussed in greater detail below, in some embodiments, there may be a single superheater tube 142 disposed circumferentially 84 in between adjacent saturator tubes 140.

Figure 19:
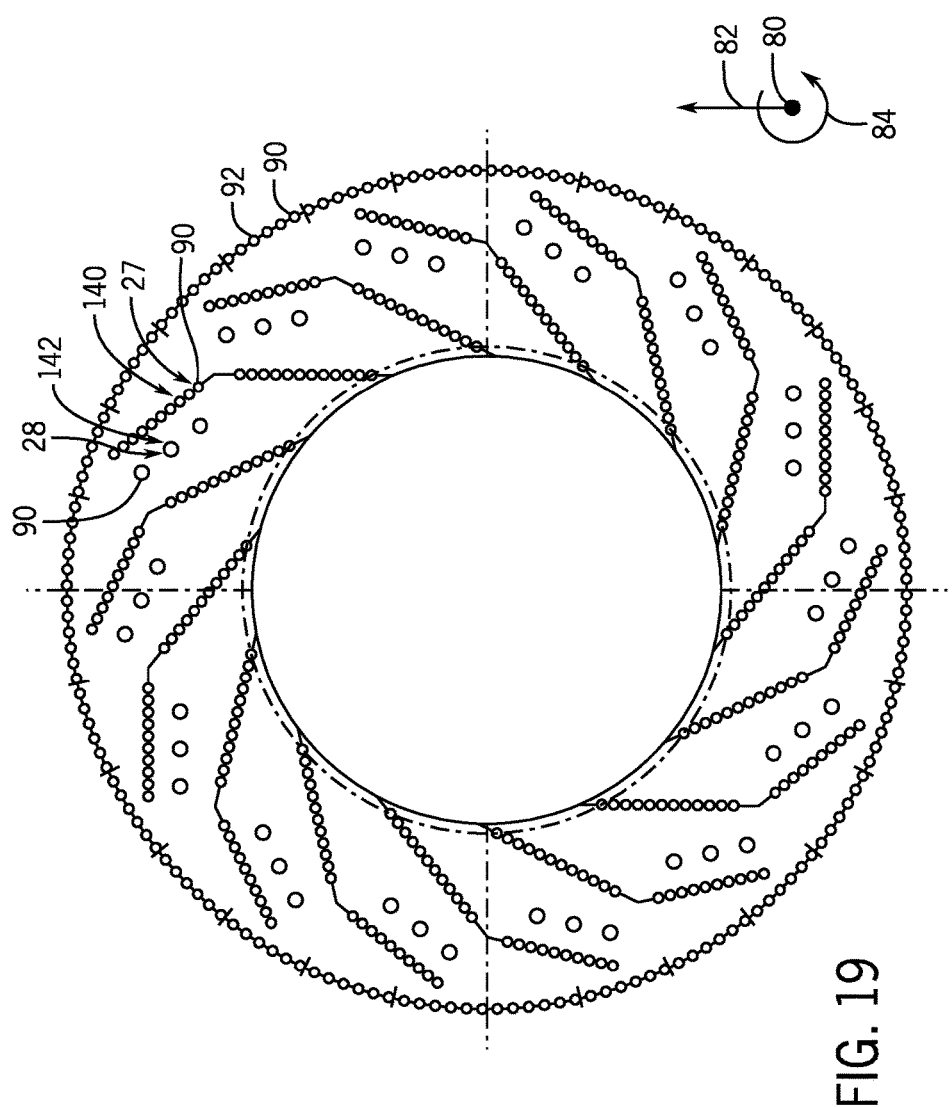
FIG. 19 is a schematic top view of an embodiment of tubes of both the superheater heat exchanger and the saturation heat exchanger of FIG. 17.

FIG. 19 is a schematic top view of an embodiment of both saturator tubes 140 of the saturator 27 and superheater tubes 142 of the superheater 28 of FIG. 17. In some embodiments, there may be 14 saturators 27 with superheaters 28 circumferentially disposed between them relative to the central axis 86. However, the number of saturators 27 and superheaters 28 may change based superheated steam, and saturated steam and water requirements of the system 10. The saturator tubes 140 may be contacting adjacent saturator tubes 140. In some embodiments, the saturator tubes 140 may be coupled together via a tube-to-tube welding, or webbing. In the current embodiment, there are 12 saturator tubes 140 on the radially 82 inner segment (e.g., inner platen) of the saturator 27 and 10 saturator tubes 140 on the radially 82 outer segment (e.g., outer platen) of the saturator 27. As described above, the number of saturator tubes 140 per segment may change based saturated steam and water requirements of the system 10. The tube cage 92 may also act as a saturator. In some embodiments, the superheater tubes 142 may be disposed more radially 82 outward than the majority of the saturator tubes 140. In some embodiments, there may be 3 superheater tubes 142 circumferentially 84 disposed between the saturator tubes 140. In some embodiments, there may be more than 3, or less than 3 superheater tubes 142 circumferentially 84 disposed between the saturator tubes 140 relative to the central axis 86. Although not shown, it should be noted that a group of superheater tubes 142 disposed between adjacent saturator tubes 140 may be connected via a header and may receive saturated steam and/or discharge superheated steam via a tube coupled to the header. The tube inlet/outlet may extend beyond the tube cage 92.

Figure 20:
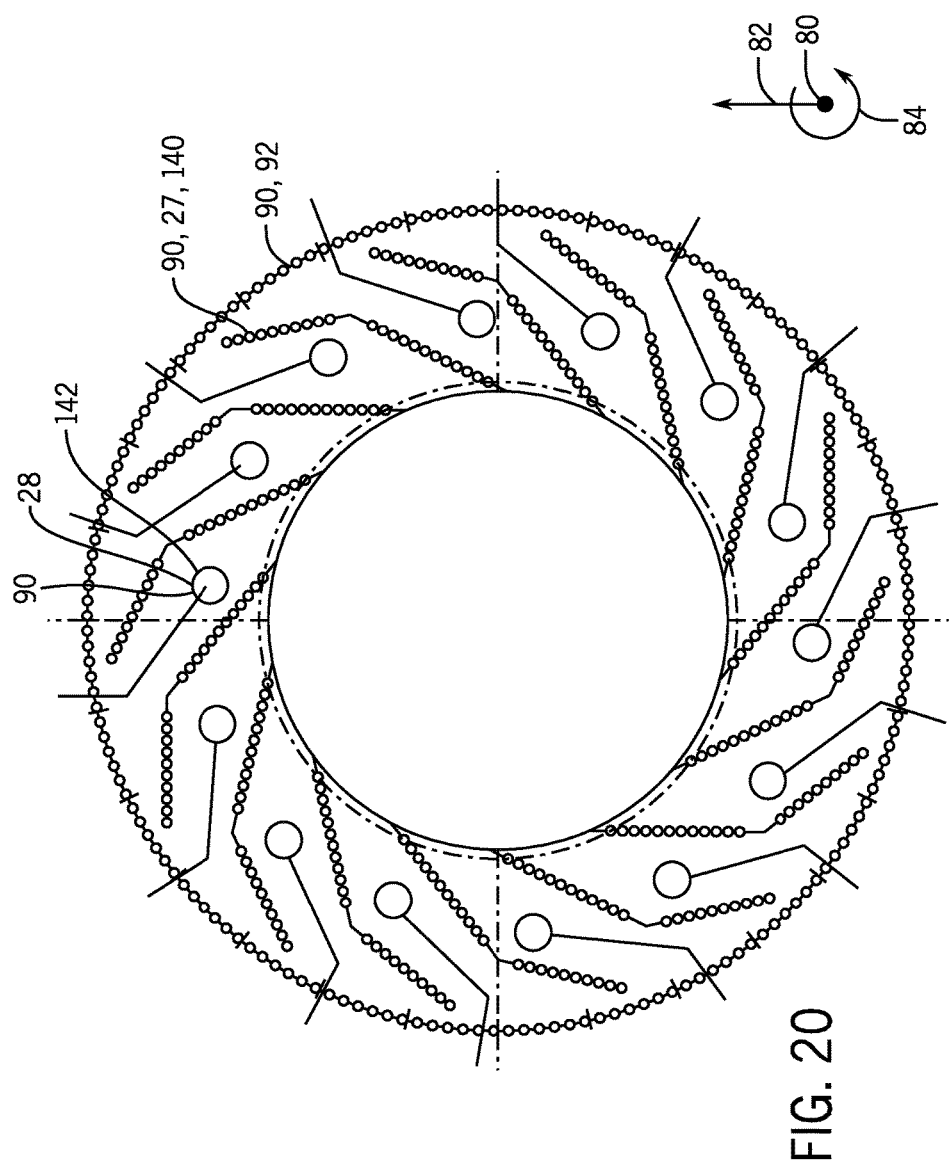
FIG. 20 is a schematic top view of an embodiment of tubes of both the superheater heat exchanger and the saturation heat exchanger of FIG. 17.

The embodiment depicted in FIG. 20 may be the same as the embodiment depicted in FIG. 19 except that in this embodiment, there is a single superheater tube 142 disposed circumferentially 84 relative to the central axis 86 between saturator tubes 140. The single superheater tube 142 may be thicker and/or have a larger diameter than superheater tubes 142 depicted in the embodiment of FIG. 19. However, in some embodiments, the superheater tube 142 of FIG. 20 may have the same thickness and diameter as the superheater tubes 142 depicted in FIG. 19. The superheater tube 142 may be approximately 3 to 4 inches in diameter. In some embodiments, the superheater tube 142 may be placed in the vicinity of the transition from one segment (e.g., platen) to the adjacent segment (e.g., platen). Although not shown, the superheater tube 142 may receive saturated steam and/or discharge superheated steam via an inlet/outlet extending beyond the tube cage 92.

The superheater and saturator tubes 142, 140 are coupled to, and extend axially 80 between headers that are adjacent the upstream end 118 and the downstream end 116. The superheater tubes 142 may not contact another superheater or saturator tube 142, 140 along the respective length to enable a flow of the syngas around each tube's outer surface along its respective length and between each superheater tube 142. Furthermore, the saturator tubes 140 may each interface with the syngas.

In the embodiments discussed herein, each superheater header (e.g., headers 114, 132, or superheater tube 142) may each receive cooling fluid from an inlet and discharge the superheated steam through an outlet. The inlet/outlet may each extend in the radial direction 82 relative to the central axis 86 beyond the tube cage 92 and the vessel 88. If the header connected to the inlet/outlet is adjacent the downstream end 116, then the inlet/outlet may be placed axially 80 above (e.g., upstream 83) a tube cage bottom header (e.g., tube cage bottom platen header). If the header connected to the inlet/outlet is adjacent the upstream end 118, then the inlet/outlet may be placed axially 80 below (e.g., downstream 85) a tube cage top header (e.g., tube cage top platen header). Each superheater inlet/outlet may be supported on the RSC 26 via a bolted flange connection, a welded joint, a box seal to absorb any differential thermal expansion, or any combination thereof. Therefore, each superheater 28 weight may be carried solely by the vessel 88. There may also be a header (e.g., manifold) to collect superheated steam exiting the outlet for downstream applications. Furthermore, the superheater tubes (e.g., superheater tubes 102, 126, 142) may use high temperature resistant and corrosive resistant materials.

Figure 21:
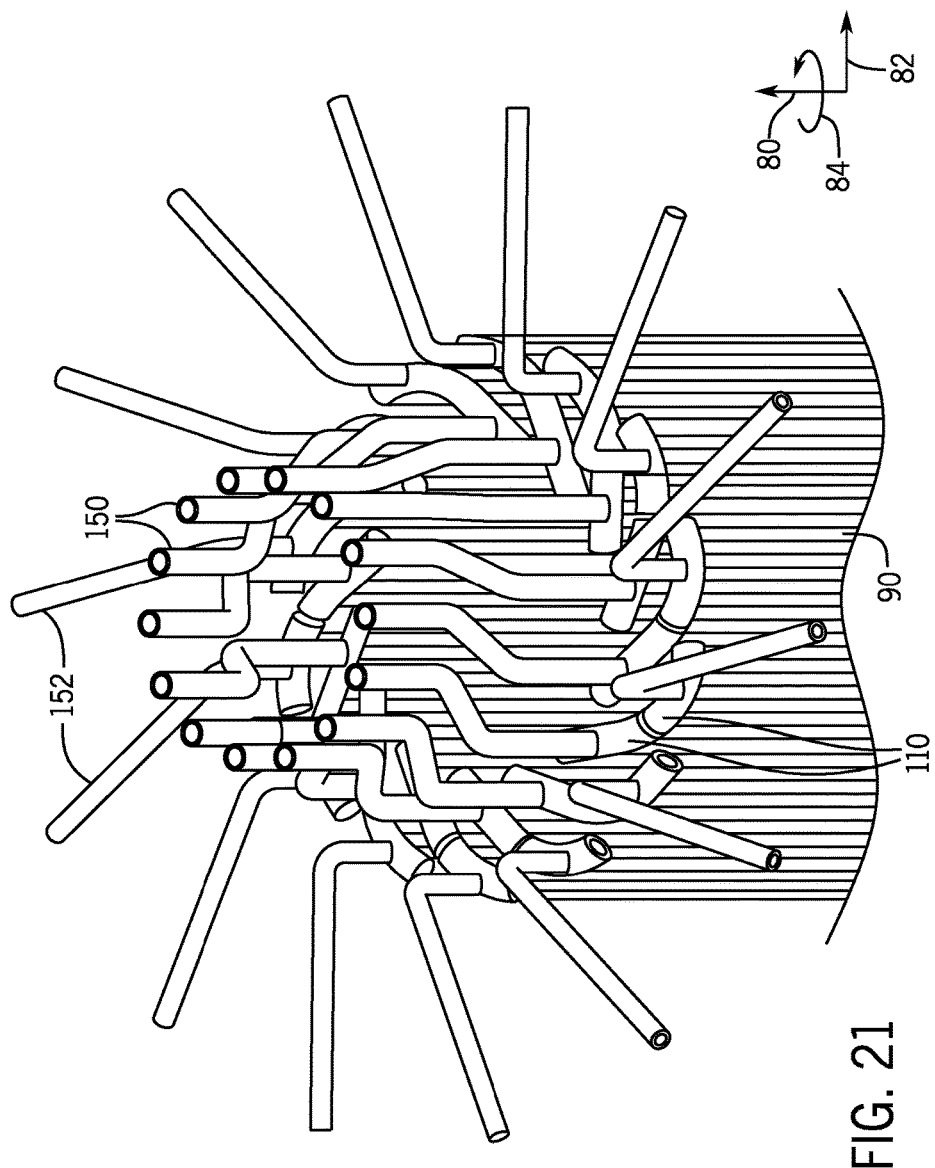
FIG. 21 is a perspective view of an embodiment of a portion of both the superheater heat exchanger and the saturation heat exchanger of FIG. 2.

FIG. 21 is a perspective view of an embodiment of a portion of heat exchangers (e.g., saturation heat exchanger 27 and superheater heat exchanger 28) of FIG. 2. As discussed above the saturator 27 and the superheater 28 may include inlets/outlets that are configured to receive or discharge cooling fluid. As shown in this perspective, the headers 110 may be connected to inlet/outlet tubes. In some embodiments, saturation heat exchanger outlet tubes 150 (e.g., saturator inlet/outlet tubes 150) may receive saturated steam and water from the header 110 and act as an outlet for saturated steam and water. As shown and described above, the saturator outlet tubes 150 may extend in the vertical direction 80 out of the RSC 26. In some embodiments, superheater heat exchanger inlet/outlet tubes 152 (e.g., superheater inlet/outlet tubes 152) may receive superheated steam from the header 110 and act as an outlet for the superheated steam. In some embodiments, the super heater inlet/outlet tubes 152 may act as an inlet for saturated steam and discharge the saturated steam to the headers 110. As shown and discussed above, the superheater inlet/outlet tubes 152 may extend substantially in the radial direction 82 out of the RSC 26.

Technical effects of the invention includes providing a means for superheating saturated steam within a syngas cooler via a superheater heat exchanger. The syngas cooler may be a component of a gasification system (e.g., an integrated gasification combined cycle). The saturated steam may have been produced via a saturation heat exchanger that is within the syngas cooler as well. Heat is exchanged with the superheater heat exchanger and the saturation heat exchanger via heat from hot syngas flowing through the syngas cooler. There may be multiple superheater heat exchangers and multiple saturation heat exchangers within the syngas cooler. However, each superheater heat exchanger may superheat steam independently. More specifically, each superheater heat exchanger may include tubes where the steam flows through and is superheated, and each tube is not attached to another to ensure uniform metal temperature and reduced thermal stresses. Further the weight of the superheater heat exchangers may be carried by the syngas cooler itself. Given that the elements of the superheater heat exchanger are fairly simple in design (e.g., flanges and tubes), this method of superheating is very cost effective when compared to an external superheater. Yet further, the system discussed above may result in a reduction in transmission losses in the saturated steam circuit of the gasification system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
 a syngas cooler configured to cool a syngas, wherein the syngas cooler comprises:
  a superheater heat exchanger, comprising:
   a first header configured to receive saturated steam;
   a second header configured to discharge superheated steam;
   a first plurality of tubes directly coupled to and vertically extending between the first and second headers, wherein each tube of the first plurality of tubes comprises an outer surface that interfaces with the syngas and a respective length between the first and second headers, and each tube of the first plurality of tubes does not contact another tube along the respective length to enable a flow of the syngas around each tube's outer surface along its respective length and between each tube;
a third header configured to receive water;
a fourth header configured to discharge saturated steam; and
a second plurality of tubes directly coupled to and vertically extending between the third and fourth headers, wherein each tube interfaces with the syngas, wherein the superheater heat exchanger and the saturation heat exchanger are located at a same axial location relative to a longitudinal axis of the syngas cooler.

2. The system of claim 1, wherein the syngas cooler comprises a plurality of superheater heat exchangers and a plurality of saturation heat exchangers, and each superheater heat exchanger of the plurality of superheater heat exchangers is circumferentially disposed relative to the longitudinal axis between a pair of saturation heat exchangers of the plurality of saturation heat exchangers.

3. The system of claim 1, wherein the superheater heat exchanger and the saturation heat exchanger are disposed radially adjacent each other relative to the longitudinal axis, and a majority of the superheater heat exchanger is radially outward of the saturation heat exchanger relative to the longitudinal axis.

4. The system of claim 1, wherein the syngas cooler comprises a substantially cylindrical vessel having a top end and a bottom end, and the superheater heat exchanger vertically extends from adjacent the top end to adjacent the bottom end.

5. The system of claim 1, wherein the syngas cooler comprises a tube cage disposed radially outward of both the superheater heat exchanger and the saturation heat exchanger relative to a longitudinal axis of the syngas cooler.

6. The system of claim 1, wherein the first plurality of tubes is directly coupled to the first header and the second header in a staggered arrangement.

7. The system of claim 1, wherein the syngas cooler comprises a radiant syngas cooler.

8. The system of claim 1, comprising a gasifier coupled to the syngas cooler.

9. The system of claim 1, comprising an integrated gasification combined cycle system comprising the syngas cooler.

10. A syngas cooler configured to cool a syngas, wherein the syngas cooler comprises:
a plurality of superheater heat exchangers, wherein each superheater heat exchanger comprises:
a first header configured to receive saturated steam;
a second header configured to discharge superheated steam; and
a first plurality of tubes directly coupled to and vertically extending between the first and second headers, wherein each tube of the first plurality of tubes comprises an outer surface that interfaces with the syngas and has a respective length between the first and second headers, and each tube of the first plurality of tubes does not contact another tube along the respective length to enable a flow of the syngas around each tube's outer surface along its respective length and between each tube; and a plurality of saturation heat exchangers, wherein each saturation heat exchanger, comprises:
a third header configured to receive water;
a fourth header configured to discharge saturated steam; and
a second plurality of tubes directly coupled to and vertically extending between the third and fourth headers, wherein each tube of the second plurality of tubes interfaces with the syngas;
wherein the plurality of superheater heat exchangers and the plurality of saturation heat exchangers are located at a same axial location relative to a longitudinal axis of the syngas cooler.

11. The syngas cooler of claim 10, wherein each superheater heat exchanger of the plurality of superheater heat exchangers is circumferentially disposed relative to the longitudinal axis between a pair of saturation heat exchangers of the plurality of saturation heat exchangers.

12. The syngas cooler of claim 10, wherein at least one superheater heat exchanger of the plurality of superheater heat exchangers and at least one saturation heat exchanger of the plurality of saturation heat exchangers are disposed radially adjacent each other relative to the longitudinal axis, and a majority of the at least one superheater heat exchanger is disposed radially outward of the at least one saturation heat exchanger relative to the longitudinal axis.

13. The syngas cooler of claim 10, wherein each superheater heat exchanger of the plurality of superheater heat exchangers is circumferentially disposed relative to the longitudinal axis between a pair of saturation heat exchangers of the plurality of saturation heat exchangers.

14. The syngas cooler of claim 10, wherein the syngas cooler comprises a substantially cylindrical vessel having a top end and a bottom end, and both the plurality of superheater heat exchangers and the plurality of saturation heat exchangers vertically extend from adjacent the top end to adjacent the bottom end.

15. A syngas cooler configured to cool a syngas, wherein the syngas cooler comprises:
a plurality of superheater heat exchangers, wherein each superheater heat exchanger comprises:
a first header configured to receive saturated steam;
a second header configured to discharge superheated steam; and
a first plurality of tubes directly coupled to and vertically extending between the first and second headers, wherein each tube of the first plurality of tubes comprises an outer surface that interfaces with the syngas and a respective length between the first and second headers, and each tube of the first plurality of tubes does not contact another tube along the respective length to enable a flow of the syngas around each tube's outer surface along its respective length and between each tube;
a plurality of saturation heat exchangers, wherein each saturation heat exchanger, comprises:
a third header configured to receive water;
a fourth header configured to discharge saturated steam; and
a second plurality of tubes directly coupled to and vertically extending between the third and fourth headers, wherein each tube of the second plurality of tubes interfaces with the syngas;
wherein the plurality of superheater heat exchangers and the plurality of saturation heat exchangers are located at different axial locations relative to a longitudinal axis of the syngas cooler; and a tube cage disposed radially outward of both the plurality of superheater heat exchangers and the plurality of saturation heat exchangers relative to the longitudinal axis.

16. The syngas cooler of claim 15, wherein the tube cage comprises a conical section axially disposed relative to the longitudinal axis between the plurality of superheater heat exchangers and the plurality of saturation heat exchangers.

\* \* \* \* \*